United States Patent [19]

Sarpaneva

[11] 4,367,086
[45] Jan. 4, 1983

[54] METHOD FOR PRODUCING DECORATIVE GLASS OBJECTS

[76] Inventor: Timo Sarpaneva, Via Navegna 7, Minusio, Switzerland

[21] Appl. No.: 269,037
[22] PCT Filed: Oct. 24, 1980
[86] PCT No.: PCT/FI80/00001
  § 371 Date: May 13, 1981
  § 102(e) Date: May 13, 1981
[87] PCT Pub. No.: WO81/01142
  PCT Pub. Date: Apr. 30, 1981

[30] Foreign Application Priority Data

Oct. 26, 1979 [FI] Finland ................................. 793360

[51] Int. Cl.$^3$ ....................... C03B 19/02; C03B 19/08
[52] U.S. Cl. ......................................... 65/22; 65/122; 65/123
[58] Field of Search ........................... 65/122, 123, 22

[56] References Cited

U.S. PATENT DOCUMENTS

| | | | |
|---|---|---|---|
| 1,311,474 | 7/1919 | Wadsworth | 65/123 |
| 1,715,130 | 5/1929 | Haley | 65/22 |
| 1,816,045 | 7/1931 | Haley | 65/22 |
| 2,596,990 | 5/1952 | Doyle | 65/72 |
| 3,245,770 | 4/1966 | Cortright et al. | 65/122 X |

FOREIGN PATENT DOCUMENTS 597273 5/1934 Fed. Rep. of Germany .

*Primary Examiner*—Robert L. Lindsay, Jr.
*Attorney, Agent, or Firm*—Scully, Scott, Murphy & Presser

[57] ABSTRACT

A method for producing decorative glass objects in which the decoration is created by blisters formed by air bubbles within solid glass and/or by a pattern on the outer surface of the glass. When producing glass objects provided with air bubbles by means of known methods the bubbles remain on the surface of the objects which then easily break. In addition, the bubbles are formed at random, which may make them appear as dim impurities. When, in accordance with the invention, molten glass is poured from above in the shape of a band into a hot mould, the molten glass is spread into the mould in layers between which microscopic air bubbles remain. As the glass surface cools, the air enclosed within the bubbles expands in the molten glass which, while cooling, leaves the bubbles as clear pearls inside the glass. As the molten glass is spread in layers towards the wall of the mould, a pattern is formed as the glass surface cools.

6 Claims, 4 Drawing Figures

METHOD FOR PRODUCING DECORATIVE GLASS OBJECTS

The present invention relates to a method for producing decorative glass objects in which the decoration is created by clear pearls formed by air bubbles within solid glass and/or by a pattern essentially formed by streaks on the outer surface of the glass.

Glass with bubbles has previously been produced either by using sodium carbonate or by boiling molten glass in a furnace before starting the production in order to produce blisters. However, when using these methods, the outcome has not been controllable but has been rather random, which has resulted in an extremely high waste percentage. Moreover, these methods have only been applicable to manual glass-making.

The use of sodium carbonate has resulted in too big bubbles or too small bubbles appearing as a dim impurity in the glass. Bubbles produced during boiling as well as by using sodium carbonate remain on the outer and inner surfaces of the objects, which thus become fragile.

The accompanying drawing illustrates some applications of the invention.

Figure 1:
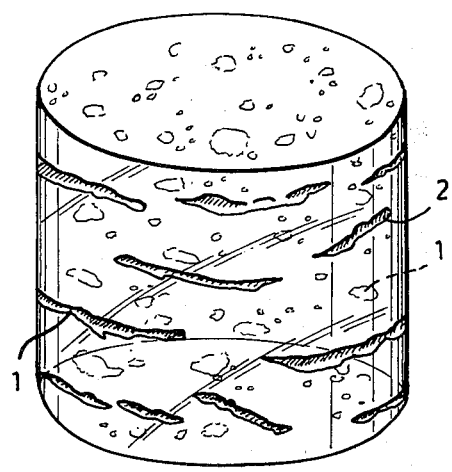
FIG. 1 is a front view of a length cut off from a cylindrical, solid glass object.
Figure 2:
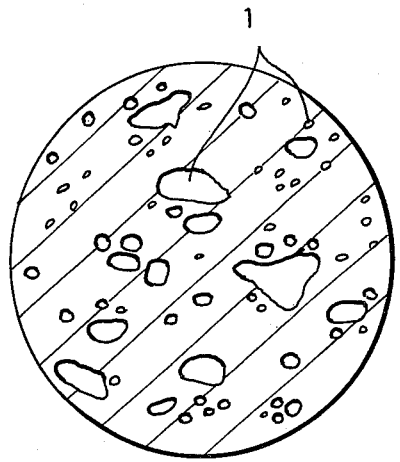
FIG. 2 shows the same in cross-section. Inside the glass object there are blisters or pearls 1 of different sizes and on the surface streaks 2 to a small extent.
Figure 3:
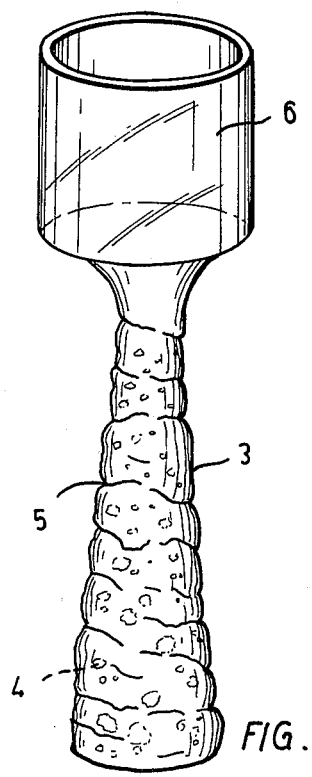

FIG. 3 illustrates a stem glass provided with a solid stem 3 made by means of the method according to the invention and having blisters 4 inside and streaks 5 on the outer surface. To this stem 3 has been secured by blowing a bowl 6 made simultaneously therewith.

Figure 4:
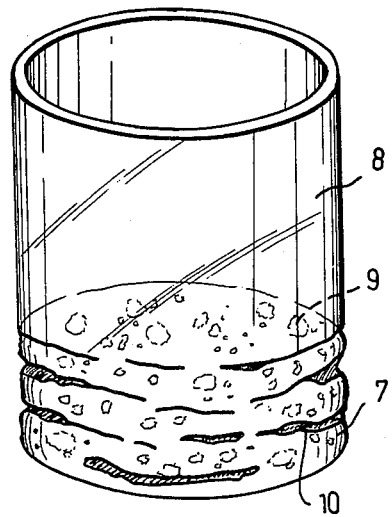

FIG. 4 is a front view of a drinking glass provided with a solid stem portion 7 made by means of the method according to the invention and with a bowl portion 8 produced simultaneously therewith and secured thereto by blowing. The stem portion is provided with blisters 9 and streaks 10.

By means of the method according to the invention fully clear pearls can be produced within the glass. The variable size of the pearls and their "arbitrary" grouping create a strong impression of beauty resembling the overall impression given by the Archipelago Sea, for which reason the method according to the invention is called the "Arkipelago" method.

By means of the method it is also possible to provide the outer surface of glass with a pattern mainly consisting of streaks. Both the pattern and the blisters formed by pearls are fully controllable. The proportions of both the pattern and the blisters can each be separately increased or reduced, the extreme cases essentially comprising blisters only or essentially pattern only (blisters always appear to some extent).

According to the invention, molten glass is poured in the shape of a band either mechanically or manually from above into a hot mould whereby the glass is spread into the mould in layers between which microscopic air bubbles remain. The temperature of the mould is lower than the temperature of the glass melt poured whereby, as the glass surface cools, the core still remains hot and the air enclosed within the bubbles expands in the still molten glass which, while slowly cooling, leaves the bubbles as clear pearls inside the glass. As the molten glass is spread in layers towards the wall of the mould, a pattern (for example, comprising streaks) is formed as the glass surface cools.

In connection with the invention, it has been found that, in order to produce satisfactory blisters and a satisfactory pattern, the molten glass must be poured in the shape of a band into the moulds from a relatively high level. A level of about 50 to 70 cm has proved to be advantageous. Within this range, a wide control of both the blisters and the pattern is possible. If a lower level is used, there will be less blisters and less pattern and, when pouring the molten glass from a level right above the mould, the effect according to the invention will no longer be obtained.

In addition to the pouring level, the blisters and the pattern can also be controlled by means of the quantity of molten glass poured. The bigger the quantity of molten glass poured per unit of time is, the smaller will be the effect obtained according to the invention. Said quantity, of course, depends on the cross-sectional area of the mould. When molten glass is poured through a nozzle, the ratio between the cross-sectional area of the nozzle opening and the cross-sectional area of the mould will determine the relative quantity of molten glass poured per unit of time. As this ratio is increased, the quantity of molten glass increases and the proportion of blisters and pattern is reduced.

The nozzle may be of any appropriate cross-sectional shape, for example, of a circular or elliptical shape.

As stated above, the formation of blisters and pattern can be controlled in the desired manner by means of the pouring level and the quantity of molten glass poured. The blisters and the pattern produced in glass objects are fully controllable and reproducable. Due to this, the method can be carried into effect both manually and mechanically. It is also possible to produce a decorative glass object batchwise (chargewise), in which case the pouring level and/or the quantity of poured glass is changed between batches. In this way, a fairly high glass object can be produced, in which the decorative effect varies in the vertical direction and corresponds to the conditions of the batches used.

The method according to the invention may be combined with traditional glass-making methods. Thus, for example, the bowl portions of drinking glasses and bowls can be secured by blowing to a stem portion simultaneously made by means of the method according to the invention either by using blowing by blowpipe or automatic equipment.

What I claim is:

1. A method for producing a decorative glass object in which the decoration is created by blisters formed by air bubbles within solid glass and/or by a pattern on the outer surface of the glass, characterized in that molten glass is poured from above in the shape of a band into a hot mould at a suitable distance above said mould whereby said molten glass is spread in layers into said mould between which air bubbles remain to form said blisters, the temperature of the mould being lower than the temperature of the molten glass, whereby as the glass surface cools, the core still remains hot and air enclosed within the bubbles expands in the still molten glass which, while cooling, forms clear pearls inside the glass.

2. A method as claimed in claim 1, characterized in that the desired blisters and/or the desired pattern are produced by selecting an appropriate pouring level.

3. A method as claimed in claim 2, characterized in that the molten glass is poured into the mould from a height between 50 to 70 cm.

4. A method as claimed in claim 1 or 2 or 3, characterized in that the desired extent of blisters and/or the desired pattern are controlled by controlling the quantity of molten glass poured per unit of time.

5. A method as claimed in claim 1 or 2 or 3 further including the step of forming a portion of the decorative glass object by blowing a glass object in a conventional manner.

6. A method as claimed in claim 5, characterized in that a decorative stem portion is made to which a bowl portion of a drinking glass or of a bowl is secured by blowing.

* * * * *